Aug. 29, 1967     W. J. BARBIER     3,338,518

PILOT OPERATED VALVE

Filed April 14, 1965     2 Sheets-Sheet 1

INVENTOR:
WILLIAM J. BARBIER
BY Charles B. Haverstock
ATTORNEY,

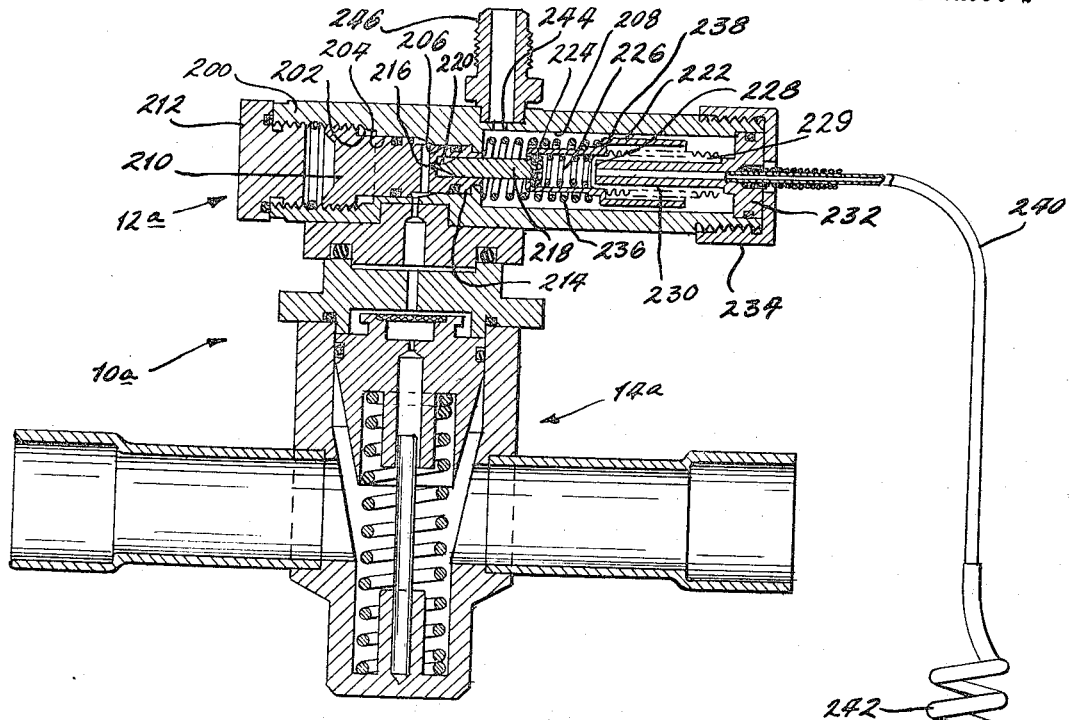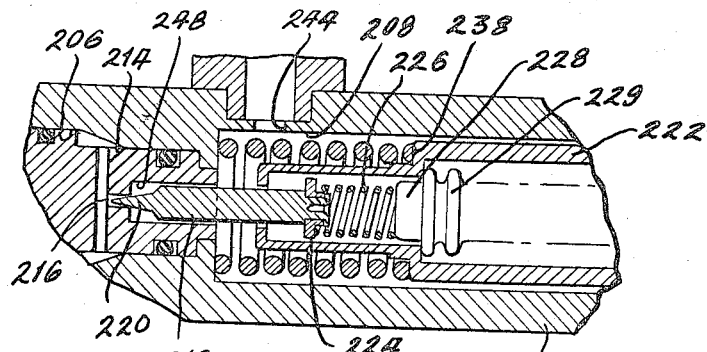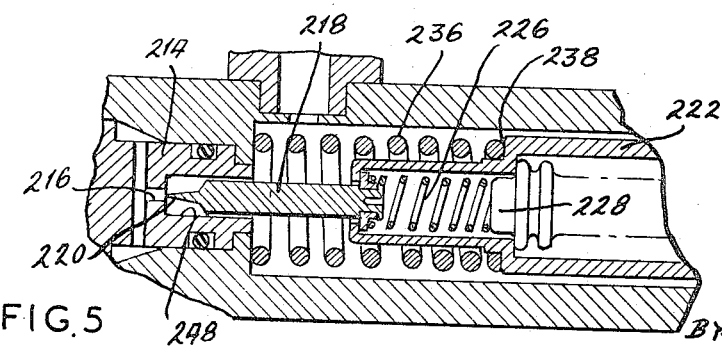

United States Patent Office 3,338,518
Patented Aug. 29, 1967

3,338,518
PILOT OPERATED VALVE
William J. Barbier, Overland, Mo., assignor to Jackes-Evans Manufacturing Company, St. Louis, Mo., a corporation of Missouri
Filed Apr. 14, 1965, Ser. No. 448,046
16 Claims. (Cl. 236—86)

The present invention relates generally to valves and like devices and more particularly to a control valve for fluid systems.

Many different kinds of valves are in existence and are used to control fluid flow. For the most part, however, the known valves have cooperating seat portions which mate in certain positions but not in others to control or prevent flow therethrough. It is not always necessary or desirable, however, to prevent flow altogether and in fact in some situations including certain refrigeration and other applications it is often more desirable to restrict than stop the flow under certain conditions. In these situations it is often also desirable to prevent certain of the valve parts from coming together and mating which may produce undesirable wear of critical parts. By preventing critical valve parts from coming together, faulty operation caused by sticking and binding is also minimized. The subject valve overcomes these and other undesirable features of known valves and at the same time provides relatively accurate control valves capable of satisfying a wide range of flow control applications.

It is therefore a principal object of the present invention to provide an improved flow control valve.

Another object is to provide a control valve that is incapable of completely preventing flow therethrough.

Another object is to provide relatively inexpensive valve means capable of operating over a wide range of pressure differentials.

Another object is to provide a valve which produces a minimum of flow direction change.

Another object is to provide a valve particularly well suited to refrigeration and other cooling operations.

Another object is to provide reliable flow control valve means for return lines to compressors and like devices.

Another object is to reduce wear and maintenance on critical valve members.

Another object is to minimize malfunctions in valves caused by sticking and binding of parts.

Another object is to provide pilot operated valve means capable of accurate and precise adjustment and control.

Another object is to prolong the life of pilot operated valves and like devices.

These and other objects and advantages of the present invention will become apparent to those skilled in the art after considering the following specification and the accompanying drawings, wherein:

FIG. 3 is a cross-sectional view showing a modified form of the subject valve; and FIGS. 4 and 5 are enlarged fragmentary cross-sectional views showing pilot control portions of the modified valve in two different operating positions.

Figure 1:
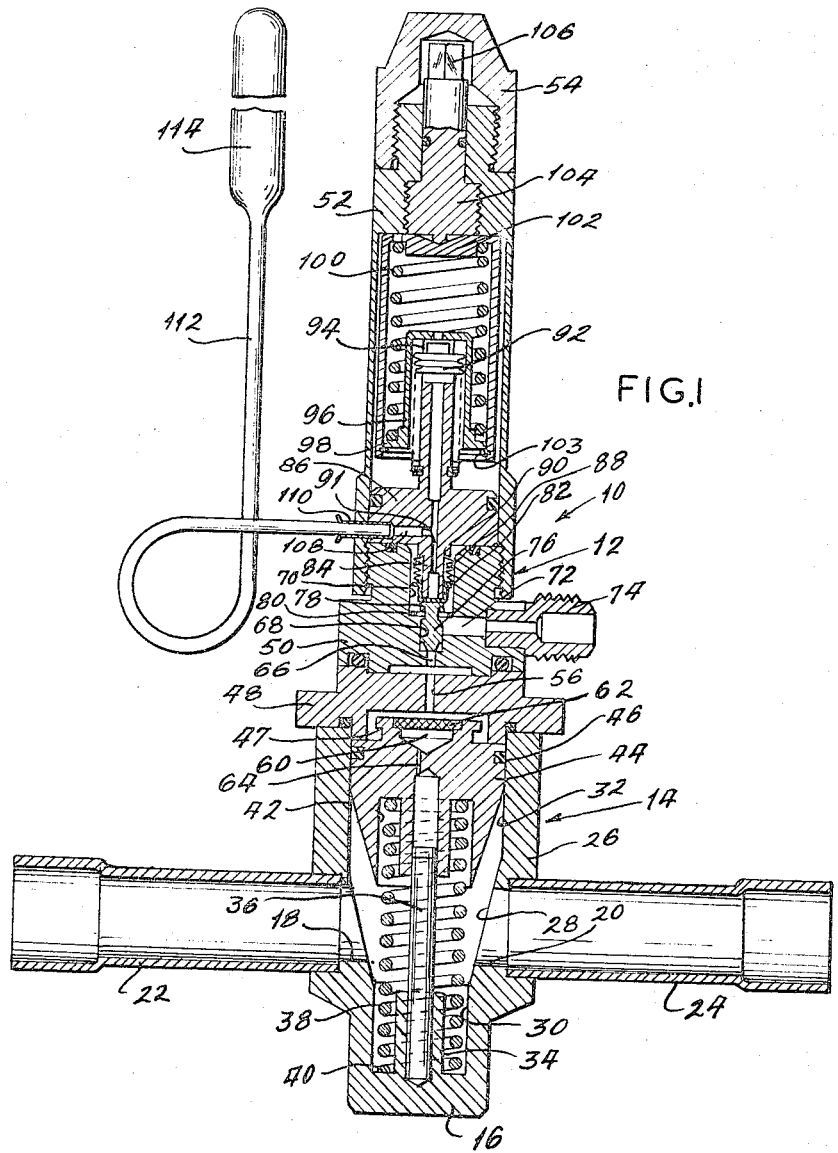
FIG. 1 is a cross-sectional view through a pilot operated control valve constructed according to the present invention.

Referring to the drawing more particularly by reference numbers, the number 10 identifies a pilot operated valve constructed according to the present invention. The valve 10 includes an upper control portion 12 and a lower main valve portion 14. The main valve portion 14 includes a housing 16 with two ports 18 and 20 which can alternatively be used as the inlet and outlet. A tubular conduit 22 is shown fitted into the port 18 and another conduit 24 is fitted into the port 20. The opposite ends of the tubes 22 and 24 are swaged for connecting to other tubes in a system. Threaded connections can also be used, if desired.

The housing 16 has a main central chamber 26 defined by an annular tapered surface 28 which extends between a small diameter cylindrical chamber 30 and a larger diameter cylindrical chamber 32. An integral annular sleeve 34 extends upwardly from the bottom of the chamber portion 30 and supports a pin 36 the upper end of which is provided for alignment purposes as will be shown.

A compression spring 38 is positioned in the chamber 26 and has its lower end supported on the bottom surface 40 thereof. The upper end of the spring 38 extends into an annular socket 42 formed in a main movable valve member 44 which is slidably positioned in the larger diameter cylindrical portion 32 of the chamber 26. The movable valve member 44 carries an O-ring 46 which makes a sliding and sealing engagement with the surface of the housing portion 32, and the upper end of the member 44 has an annular flange portion 47 which is useful when removing the member 44 from the chamber 26 during disassembly.

The control portion 12 of the valve 10 is attached to the main valve portion 14 by suitable means such as threaded members (not shown), and the control portion is formed by connected members 48, 50, 52 and 54. The member 48 is sealably connected to the housing portion 16 and has a relatively small passage 56 through it which communicates at one end with the chamber 26 above the piston 44. The upper end of the piston 44 also has a recess or chamber 60 formed in it which is closed by a filter member 62. The recess 60 communicates with the chamber 26 below the movable piston 44 through a restricted flow passage 64 which is provided to limit the pressure differential that can be established across the member 44.

The member 50 is sealably attached to the member 48 by means including another O ring and it has three communicating chambers 66, 68 and 70 therein. The chamber 66 communicates at one end with the passage 56 in the member 48 and at its opposite end with one end of the chamber 68. The chamber 68 communicates with the chamber 70 and also with a radially extending port 72. The port 72 receives a threaded fitting 74 which is connected to one end of a suitable conduit when the valve is used in a system such as a refrigeration system or the like. In such a system the conduit is usually connected to a relatively high pressure point in the system such as the pressure at the outlet side of a compressor or at the downstream side of a condenser or receiver.

A movable plunger 76 is slidably positioned in the pilot chamber portion 68 to control communication between the passages 56 and 72. The plunger 76 has a shoulder portion 78 formed on one end (the upper end in FIG. 1) which cooperates with the smaller diameter end of a tapered compression spring 80. The larger end of the spring 80 is seated against a shoulder formed at the junction between the chambers 68 and 70. The plunger 76 also engages a movable member 82 which is slidably located in the chamber 70. The member 82 cooperates with a downwardly extending projection 84 on member 86 and is sealably connected to the lower end of a bellows 88. The opposite end of the bellows 88 is connected to the projection 84 at shoulder 90.

A pilot port 91 extends through the member 86. One end of the pilot port communicates with the inside of a bellows 88 and the other end communicates with the inside of another bellows 92. The bellows 92 has a cover portion 94 which engages another movable member 96 which has an annular flange portion 98 that is engaged with one end of a relatively heavy spring 100. The opposite end of the spring 100 engages a surface on a cup-shaped adjustable member 102. The member 102 also carries a ring member 103 that prevents the member 96 from coming out. The compression force on the spring 100 is adjustable by means of a threaded adjustment member 104 which extends through the member 52 and has a portion 106 which can be engaged by a wrench. When the member 104 is rotated it moves the member 102 which in turn changes the compression on spring 100. The cap member 54 is threadedly attached to the member 52 to conceal the adjustment member 104 and to provide a finished appearance for the valve.

The pilot port 91 in the member 86 in addition to communicating with the bellows 88 and 92, also communicates with a radial passage 108, which has a fitting 110 connected to conduit 112. The opposite end of the conduit 112 is connected to a temperature sensitive element or bulb 114 which is positioned to respond to a particular condition to be controlled such as a particular temperature produced by a refrigeration system. When the control temperature increases the liquid in the bulb 114 and in the conduit 112 will expand and will apply pressure in the bellows 88 and 92. This pressure will also be applied to the upper end of the pilot valve member 76 in a direction to move member 76 to further restrict or prevent the high pressure passage 72 from communicating with the passage 66 and with the space 26 above the main piston 44. Under these conditions the pressure on top of the piston 44 will be reduced and the piston 44 will move upwardly in the chamber 26 to open the main valve portion 14 and to provide relatively unrestricted flow therethrough.

On the other hand, when the control temperature sensed by the bulb 114 is relatively low, the member 76 will move away from the passage 66 thereby establishing communication between the passages 72 and 66. This permits the relatively high pressure introduced through the fitting 74 to be present in the chamber 26 to cause the piston 44 to move toward a more flow restricting position. This will reduce the total cooling produced by the system which is the condition desired when the control temperature is relatively low. It should also be noted that the restricted flow passage or orifice 64 through the main piston member 44 limits the pressure differential that can be produced thereacross and hence modifies or modulates the operation of the valve. Note also that adjustment of the member 104 as aforesaid changes the operating range of the valve by changing the effectiveness of the pressure produced in the temperature sensitive bulb 114 on the valve member 76. This in turn changes the amount of control pressure required to move the pilot valve member to its fully open and fully closed positions and also provides means for absorbing pressures produced by the bulb 114 beyond what is necessary to open and close the pilot valve.

Figure 2:
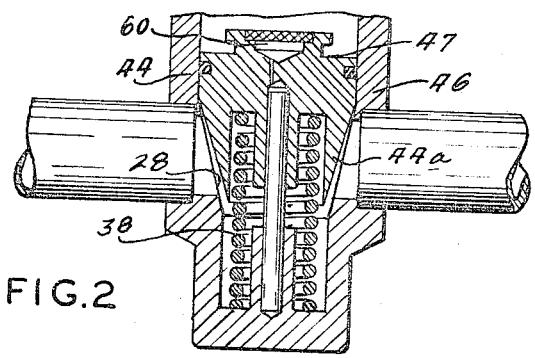
FIG. 2 is an enlarged fragmentary cross-sectional view showing the main valve portion of the subject device in a different operating condition.

FIG. 2 shows the piston 44 in its most flow restricting position. In this view it should be noted that the outer surface 44a of the member 44 is tapered at a different angle than the cooperating adjacent surface 28 of the housing 20. This is shown exaggerated to illustrate that the valve, even in its most flow restricting condition, is not completely closed. This is an important feature of the valve and means that there will always be some flow through the valve. It also means that the surface 44a and 28 can never come into surface-to-surface contact and therefore cannot stick, bind or wear. This also reduces maintenance. The construction of the main valve portion is also such that the flow through it is relatively straight and unrestricted and therefore does not trap fluid.

The subject valve is designed particularly for use in the suction or return lines to compressors used in refrigeration systems and like systems such for example as the systems shown in copending Miller application Ser. No. 305,422, filed Aug. 29, 1963, and Barbier application Ser. No. 386,602, filed July 29, 1964. In such systems it is usually desirable to permit some return flow to the compressor under all operating conditions. Furthermore, suction line controls for refrigeration systems and the like must be able to handle gases as well as fluids and for this reason in the past have been relatively large and expensive. Even so, the known devices have excessively restricted and trapped oil returning to the compressor and have starved the compressor and placed undue burden thereon which has resulted in wear and maintenance problems. The present valve, on the other hand, is never completely closed and therefore always allows some oil or other fluid to return to the compressor regardless of how the return flow is established. This prevents starving of the compressor even under conditions when minimum refrigeration is required. In addition to these and other operating advantages, the subject valve also has the advantages of being relatively small, lightweight, inexpensive and capable of being adjusted to operate under many different pressures and pressure differentials. Furthermore, the subject valve has a relatively long maintenance free life expectancy inasmuch as the main relatively movable valve portions never come into surface-to-surface contact or abutment. Another important advantage is that the subject valve does not substantially change the flow direction of a system in which it is installed and therefore pressure losses in the system are minimized. In known constructions such losses are usually minimized by enlarging the size and hence the cost of the valves. This is not true of the subject valve which, as already stated, can be relatively small and lightweight.

The subject valve is also self-balancing and self-modulating to effect the most desirable throttling and operating conditions therefor. This is due to the fact that the line pressure operating against the lower surface of the main movable valve member 44 opposes the pressure applied above the said valve member. These opposing pressures position the movable valve member in the most desirable location regardless of the magnitudes of the opposing pressures. This in turn produces the desired throttling action for the applied pressures. The subject valve can therefore be used as a temperature responsive suction throttling valve which provides a modulated artificial pressure drop in a suction or other line of a refrigeration, air conditioning or like system. The subject valve can also be made to respond to variable conditions other than temperature without departing from the spirit and scope of the invention. Under actual test conditions it has been found that the subject valve is capable of controlling temperatures within a very narrow range even under varying capacity requirements. Furthermore, by introducing suction line pressure drops responsive to load requirements, the subject valve is able to balance system components such as the evaporators, compressors and associated units and in so doing eliminates undesirable on-off operations which have characterized known controls for similar purposes.

The subject valve also lends itself to use in systems where a plurality of different units connected in series or parallel or both and having the same or different requirements are fed by the same compressor. For example, the subject valve can be used in multiplex refrigerations system such as are employed in supermarkets or grocery stores to operate the many different individual cooling units including deep freezes, produce coolers, refrigerators and air conditioners, all without sacrificing capacity under different load conditions. The subject valve is also designed for unrestricted pulldown and does not use suction line pressure loss to hold it open under high load conditions. In addition to the above advantages, the subject valve provides capacity modulation all the way from full load conditions or greater down to around 15% load or less with an infinite number of intermediate capacities and without operating in fixed steps thereby eliminating the need for unloaders and like devices employed heretofore. Systems employing the subject valves 10 are also simpler to construct, install and maintain than known systems used for the same purposes.

Valves constructed according to the present invention have been used to produce controlled temperature conditions within a relatively wide range such as between −40° F. and 80° F. Within this range the temperature has been controlled over long periods, and varying demands without fluctuating more than a degree or so. When relatively heavy springs are used in the subject valve it also minimizes "hunting," stabilizes the operation, and reduces hysteresis effects. This in turn eliminates any penalty of suction pressure loss when the valve is in the open position inasmuch as the valve is not dependent on the suction pressure drop. Furthermore, as noted above, the operating condition can be adjusted to produce a particular control temperature by adjusting the member 106 using a simple wrench or other hand tool. When the adjusting member 106 is turned in one direction it moves the member 102 downwardly in the housing 52 compressing the spring 100 and causing the valve to operate at a lower temperature setting. When the member 106 is rotated in the other direction the control temperature is increased or raised.

FIGS. 3, 4 and 5 show a modified form 10a of the subject valve in which the main valve portion 14a is similar to the main valve portion 14 of the construction shown in FIGS. 1 and 2. The control portion 12a, however, differs structurally from the control portion 12 although its operation and connections into a system are very similar to the valve shown in FIG. 1. The modified control portion 12a includes a tubular housing 200 with communicating bore portions 202, 204, 206 and 208 extending therethrough. A plug 210 is threadedly engaged with the bore 202 and extends into the bore portion 204 as shown. The plug 210 is sealed to the bore 204 by a suitable O ring and is adjustable to change the operating conditions of the valve. The open end of the bore 202 is sealed closed by an end plug 212 and another O ring.

A cup-shaped member 214 is sealably positioned in the bore 206 and is provided with an orifice 216 through its end portion. The member 214 freely receives one end of a plunger member 218 which has a tapered end portion 220 that cooperates with the adjacent end of the orifice 216 to control communication therethrough. The opposite end of the plunger 218 extends into a flanged end of a tubular member 222 and carries a device 224 which is large enough to prevent it from coming out through the flanged end of the member 222. The device 224 also cooperates with one end of a coil spring 226 (FIGS. 4 and 5), and the opposite end of the spring 226 engages a pressure responsive member 228 which also extends into the member 222. The pressure responsive member may include a bellows 229 mounted on a tubular portion 230 of a plug member 232 sealably held in position in the end of the housing 200 by a threaded end cap 234. It can now be seen that the control portion 12a of the modified valve 10a has only one instead of two bellows as in the construction of FIG. 1. The modified valve is also otherwise of simpler and less expensive construction.

A second larger diameter spring 236 is positioned extending around the outer surface of the smaller diameter portion of the tubular member 222. One end of the spring 236 abuts a shoulder 238 formed on the member 222, and the opposite end abuts a wall formed on the housing 200.

The housing end cap 234 and the adjacent member 232 have aligned bores which cooperatively receive one end of a flexible conduit 240, and the opposite end of the conduit 240 is connected to a temperature sensitive element 242.

The housing 200 also has a radial passage 244 which communicates with the housing bore 208, and a fitting 246 is mounted communicating with the passage 244. The fitting 246 is connected by suitable conduit means to a relatively high pressure source or high pressure point in the system such as a point near the outlet of a compressor, and the control portion 12a of the subject valve controls communication between the high pressure point and the space in the main valve portion 14a above the main movable valve member as in the case of the valve 10.

The modified valve can be adjusted for different operating conditions in a manner similar to the valve 10 by adjusting the position of the threaded member 210. In this connection it should be noted that the member 218 moves relative to the tubular member 222 under the biasing action of the spring 226, and the member 222 moves relative to the housing 200 under the biasing action of the spring 236.

FIGS. 4 and 5 respectively show in greater detail the closed and open positions of the control portion 12a of the modified valve. Note in these enlarged figures that a space is provided between the outer surface of the movable plunger member 218 and the adjacent cylindrical surface 248 of the cup-shaped member 214. This space is necessary to enable the high pressure introduced through the passage 244 to communicate with the main valve chamber when the control portion is open. The modified valve 10a is similar in many respects to the valve 10 and it operates in substantially the same way and performs substantially the same functions.

Thus there has been shown and described a novel pilot operated control valve which fulfills all of the objects and advantages sought therefor. Many other changes, variations, modifications, and other uses and applications of the subject valve will, however, become apparent to those skilled in the art after considering this specification and the accompanying drawing which disclose several particular forms thereof. All such changes, variations, modifications and other uses and applications which do not depart from the spirit and scope of the invention are deemed to be covered by the invention which is limited only by the claims which follow.

What is claimed is:

1. A pilot operated control valve comprising a valve portion having an inlet port, an outlet port and a chamber therebetween, said chamber having a wall surface extending between said inlet and outlet ports, a valve member movable in said chamber for controlling flow between the inlet and outlet ports, said valve member having a valve surface movable toward and away from the chamber wall surface and cooperating therewith to vary the communication between the said ports, said wall and said valve surfaces having contours which are incapable of surface-to-surface contact to completely prevent communication between the inlet and outlet ports, and means for varying the pressure differential across the movable valve member in response to a controlled condition to predeterminately control the relative positions of said wall and valve surfaces to control flow communication between said ports, said last named means including a pilot valve means having a first port for connection to a source of pressure, a second port for connection to the valve chamber on one side of the movable valve member, pilot valve means between said first and second ports to control communication therebetween and means including temperature sensitive means positioned to respond to the temperature of a condition to be controlled and bellows means in communication therewith, said bellows means being positioned to control the pilot valve means.

2. A pilot operated valve comprising a valve portion and a control portion, said valve portion including a housing having an inlet port, an outlet port and a chamber therebetween, said chamber having a chamber surface extending between said ports, a movable valve member positioned in said chamber and having a control surface thereon movable relative to the chamber surface to control communication between the inlet and outlet ports, said control surface having a contour different from the contour of the chamber surface so that the said surfaces are incapable of surface-to-surface contact to completely prevent communication between the inlet and outlet ports, said control portion including means to establish a pressure differential across the movable valve member to produce a predetermined relationship between the control surface and the chamber surface that varies with a condition being controlled, said control portion including pilot valve means having a first port for connection to the valve chamber on one side of said movable valve member, a second port for connection to a relatively high pressure source, a pilot valve seat between said first and second ports, and a movable pilot valve member positioned between said first and second ports for cooperating with the pilot valve seat, and means for controlling said pilot valve means to vary communication between said first and second ports in response to the condition being controlled, said control means including a temperature responsive bulb positioned to respond to the temperature of the condition being controlled, a bellows in communication with said bulb and operatively engaged with said movable pilot valve member on the same side of the pilot valve seat as said second port.

3. A pilot operated valve comprising a main valve portion and a control portion, said main valve portion having a main chamber with spaced inlet and outlet ports, a movable valve member positioned in the chamber and movable therein between an open position establishing substantially unrestricted communication between the inlet and outlet ports and a position substantially restricting said communication, yieldable means normally urging said movable valve member toward the open position, said control portion including means for establishing predetermined pressure differentials across the movable valve member in opposition to the yieldable means to move said movable valve member to a predetermined operation position, said control portion including pilot valve means including a pilot valve chamber having a pilot valve seat and a pilot valve member movable therein relative to said seat, means connecting said pilot valve chamber on one side of the pilot valve seat to a relatively high pressure source, means connecting the pilot valve chamber on the other side of the pilot valve seat to the main valve chamber on one side of the movable valve member, and means for controlling communication through the pilot valve means including means controlling the position of the pilot valve member relative to the pilot valve seat in response to a predetermined control condition, said control means including a temperature sensitive element positioned to respond to the temperature of the condition being controlled, and a bellows communicating with said element, said bellows being operatively engageable with the pilot valve member and located in the pilot valve chamber on the same side of the pilot valve seat as the connection to the high pressure source.

4. The pilot operated valve defined in claim 3 wherein said control portion includes a second movable member in communication with the temperature sensitive element, said second member moving relative to the pilot valve member in response to changes produced by the control condition.

5. The pilot operated valve defined in claim 3 wherein said movable valve member includes means for limiting the pressure differential thereacross.

6. A control valve for refrigeration systems and the like comprising a main valve portion having a main valve chamber with an inlet port, an outlet port, and a main valve member movably positioned in the chamber, cooperating relatively movable surfaces on the main valve member and on the main valve chamber for controlling flow between the inlet and outlet ports, said cooperating surfaces having contours capable of cooperating to substantially but not completely prevent communication between the inlet and outlet ports, means urging the main valve member into a normally open position to provide substantially unrestricted flow communication between the inlet and outlet ports, other means for establishing predetermined pressure differentials across the main valve member in a direction to move said member to a predetermined flow restricting position, said last named means including a pilot valve having a pilot valve chamber with a pilot valve seat and a movable pilot valve member positioned therein, means connecting the pilot valve chamber on one side of the pilot valve seat with the main valve chamber on one side of the main movable valve member, means connecting the pilot valve chamber on the other side of the pilot valve seat with a source of relatively high pressure, and means for controlling the position of the pilot valve member in the pilot valve chamber relative to the pilot valve seat to control communication between the relatively high pressure source and the main valve chamber, said last named means including a fluid filled temperature sensitive element positioned to respond to the temperature of a condition to be controlled, and expandible means in communication with said temperature sensitive element, said expandible means operatively engaging the pilot valve member to position said member relative to the pilot valve seat in response to the temperature sensed by the temperature sensitive element, said expandible member being located on the same side of the pilot valve seat as the connections to the high pressure source.

7. The control valve defined in claim 6 including means for changing the effect of the control condition on the pilot valve.

8. The control valve defined in claim 6 wherein the expandible means include bellows means.

9. The control valve defined in claim 6 wherein said temperature sensitive element produces pressure changes in the expandible means that vary in a direct relationship to the temperature of the condition being controlled.

10. A flow control valve comprising a main valve portion having an inlet, an outlet, a main valve chamber between the inlet and outlet, and a main movable valve member positioned in the chamber for controlling communication between the inlet and outlet, said main movable valve member being movable in said main valve chamber between a position establishing substantially unrestricted communication between the inlet and outlet and a position substantially but not completely restricting said communication, and control means for establishing a predetermined pressure differential across the main movable valve member to control the position thereof in the main valve chamber and the communication between the inlet and the outlet, said control means comprising a relatively high pressure source, means communicating said source with the valve chamber on one side of the movable valve member, and means for controlling communication between said source and said chamber including a pilot valve having a pilot valve chamber with a valve seat therein and a pilot valve member movable relative to said seat, and means for controlling the position of the movable pilot valve member relative to said seat including a temperature sensitive element including a member filled with a fluid which expands with increases in temperature and contracts with decreases in temperature, said member being positioned to respond to a predetermined temperature condition to be controlled, an expandible member communicating with said fluid filled member, said expandible member being positioned in the pilot chamber in operative engagement with the movable pilot valve member and on the side thereof associated with the high pressure source, said expandible member positioning the pilot valve member relative to the pilot valve seat to control communication between the high pressure source and the main valve chamber according to the temperature of the controlled condition.

11. The flow control valve defined in claim 10 wherein means are provided for changing the relationship between the position of the movable valve member and the pilot valve seat in response to the temperature of the condition being controlled.

12. The flow control valve defined in claim 10 wherein said main movable valve member includes means limiting the pressure differential that can be established thereacross.

13. A valve comprising a housing having an inlet port, an outlet port, and a chamber therebetween, said chamber having an annular tapered wall portion extending between the inlet and outlet ports, a movable valve member positioned in said chamber to control communication between the inlet and outlet ports, said valve member having an annular tapered control surface tapered at a slightly different angle than the annular tapered wall portion with which it cooperates to control communication between the said inlet and outlet ports so that for all positions of the movable valve member there will be some communication between the inlet and outlet ports.

14. The valve defined in claim 13 wherein the inlet and outlet ports are positioned substantially in alignment on opposite sides of the valve chamber and on opposite sides of the tapered chamber wall portion to minimize flow direction changes through the valve.

15. A flow control valve comprising a main valve portion having an inlet and an outlet, a chamber between the inlet and outlet, and a main valve member positioned in the chamber and movable between alternate operating positions therein to control communication between the inlet and outlet, said movable valve member being movable between a first position establishing substantially unrestricted communication between the inlet and the outlet and a second position substantially but not completely restricting said communication, and control means for establishing predetermined pressure differentials across the movable valve member to control the position thereof in the valve chamber, said control means comprising a pilot valve portion having a pilot valve chamber with a pilot valve seat and a movable pilot valve member positioned therein, said pilot valve member being movable between an open position spaced from the pilot valve seat and a closed position engaging said seat, means communicating the pilot valve chamber on one side of the pilot valve seat with the main valve chamber on one side of the main valve member, other means for communicating the pilot valve chamber on the opposite side of the pilot valve seat from the side communicating with the main valve chamber with a relatively high pressure source, the position of said movable pilot valve member controlling communication between said high pressure source and said valve chamber, means for controlling the position of the pilot valve member relative to the pilot valve seat including a temperature sensitive element positioned to respond to the temperature of a predetermined condition to be controlled, a bellows communicating with said temperature sensitive element and positioned to engage and move the pilot valve member to a position relative to the pilot valve seat that corresponds to the temperature of the condition being controlled, and means to absorb forces exerted on the pilot valve member due to temperatures in the controlled condition being outside of the range sufficient to move the pilot valve member between its fully open and closed condition.

16. The flow control valve defined in claim 15 wherein said means to absorb forces include a second bellows in communication with the aforesaid bellows, and means normally urging said second bellows into a predetermined operation condition.

References Cited
UNITED STATES PATENTS

| | | | |
|---|---|---|---|
| 896,587 | 8/1908 | Saugstad | 236—87 X |
| 1,348,604 | 8/1920 | Titus | 251—62 |
| 1,605,113 | 11/1926 | Ileman | 236—86 |
| 2,556,777 | 6/1951 | Reimuller | 236—93 |
| 2,566,173 | 8/1951 | Dillman | 236—80 |
| 2,575,042 | 11/1951 | Branson | 236—80 |
| 2,668,396 | 2/1954 | Kern | 251—327 X |
| 2,754,661 | 7/1956 | Coyne | 236—68 X |
| 3,156,413 | 11/1964 | Porland | 236—42 |
| 3,242,688 | 3/1966 | Miller | 62—217 |

WILLIAM J. WYE, *Primary Examiner.*

ALDEN D. STEWART, *Examiner.*